O. VANORMAN'S IMPROVED HUB.
No. 119,803.   Patented Oct. 10, 1871.
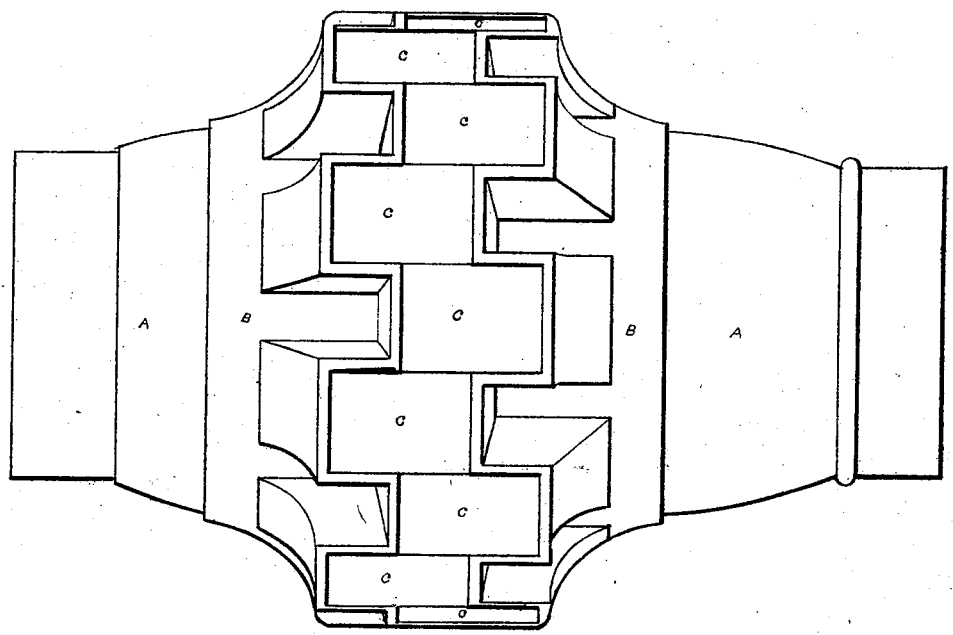
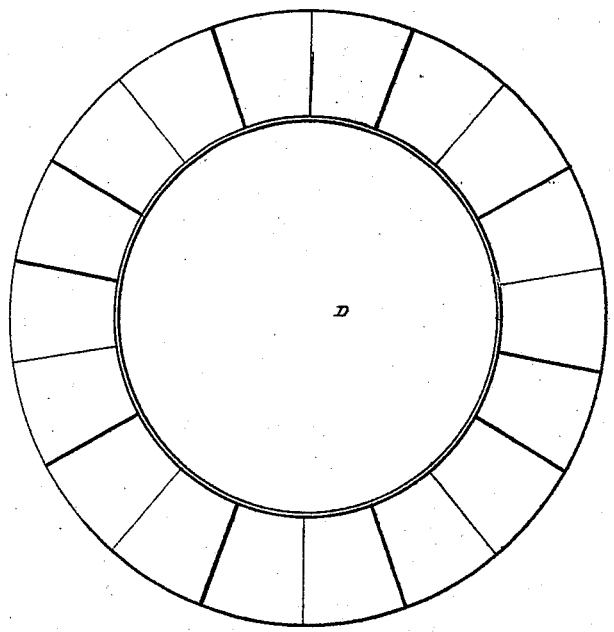
Witnesses:
H. P. Thompson
H. W. Newton
Inventor.
Oliver Vanorman

UNITED STATES PATENT OFFICE.

OLIVER VANORMAN, OF FOND DU LAC, WISCONSIN, ASSIGNOR OF ONE-HALF HIS RIGHT TO JUDSON A. ARCHIBALD, OF SAME PLACE.

IMPROVEMENT IN HUBS FOR VEHICLES' WHEELS.

Specification forming part of Letters Patent No. 119,803, dated October 10, 1871.

*To all whom it may concern:*

Be it known that I, OLIVER VANORMAN, of the city of Fond du Lac, in the county of Fond du Lac and State of Wisconsin, have invented certain Improvements in Hubs for Vehicles, of which the following is a specification:

The first part of my invention relates to the combination of two rings or bands with a slotted face, one to go on each end of the hub with slotted faces toward the spoke. The object of the slotted face is to set one-half of the spokes back of the other half, thus making a stronger wheel and less liable to tremble; said rings or bands to be made of iron, brass, or any metal that has strength sufficient, and are held against the spokes by means of rivets or bolts running through the spokes. In the second place, the object is to get a larger hub or longer tenon on the spoke, and, at the same time, set them dodging, or every other one back of the other, thus getting the required dish in the wheel and, at the same time, have face of the wheel straight.

Figure 1 is the hub with the rings or bands upon it, showing the form of my invention. Fig. 2 shows the face of the rings or bands with slotted face.

A is the hub; B B, the rings or bands. C shows the place for the spokes between the faces of the bands. D shows the form of the rings or bands with slotted face. The slots must be made in the face to taper toward the center of the hub, so that one spoke will fit in the slot and the next one will rest against the projection, and, at the same time, that portion of the two spokes coming in contact will fit together. The center of the bands fitting on the hub should be larger toward the center of the hub, thus giving a chance to fit them more secure on the hub by means of the rivets or bolts through the spokes.

What I claim is—

The combination of two rings or bands, B B, with slotted faces, together with the hub A, substantially as and for the purpose set forth.

OLIVER VANORMAN.

Witnesses:
   J. A. ARCHIBALD,
   H. P. THOMPSON. (31)